United States Patent
Wang et al.

(10) Patent No.: US 10,873,879 B2
(45) Date of Patent: Dec. 22, 2020

(54) DATA TRANSMISSION METHOD, DEVICE, AND SYSTEM

(71) Applicant: HUAWEI TECHNOLOGIES CO., LTD., Guangdong (CN)

(72) Inventors: Xinzheng Wang, Shanghai (CN); Kaijie Zhou, Shenzhen (CN); Tianle Deng, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/201,357

(22) Filed: Nov. 27, 2018

(65) Prior Publication Data
US 2019/0098534 A1    Mar. 28, 2019

Related U.S. Application Data

(63) Continuation of application No. PCT/CN2016/083779, filed on May 28, 2016.

(51) Int. Cl.
| | |
|---|---|
| *H04W 4/00* | (2018.01) |
| *H04W 28/06* | (2009.01) |
| *H04W 72/04* | (2009.01) |
| *H04W 74/08* | (2009.01) |

(52) U.S. Cl.
CPC ......... *H04W 28/06* (2013.01); *H04W 72/042* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 2008/0026766 A1* | 1/2008 | Shin | H04W 72/042 455/450 |
| 2009/0092086 A1 | 4/2009 | Lee et al. | |
| 2010/0271963 A1* | 10/2010 | Koorapaty | H04L 1/0003 370/252 |
| 2010/0290400 A1* | 11/2010 | Lee | H04L 1/1825 370/328 |

(Continued)

FOREIGN PATENT DOCUMENTS

| | | |
|---|---|---|
| CN | 1996806 A | 7/2007 |
| CN | 101437291 A | 5/2009 |

(Continued)

OTHER PUBLICATIONS

International Search Report dated Feb. 14, 2017 in corresponding International Patent Application No. PCT/CN2016/083779.

(Continued)

*Primary Examiner* — Clemence S Han
(74) *Attorney, Agent, or Firm* — Womble Bond Dickinson (US) LLP

(57) ABSTRACT

In a data transmission method, a terminal can determine, based on the transmission resource occupation status information broadcast by the base station, the transmission resource unit used to send the first data packet. This avoids a problem in a non-scheduled solution that a terminal does not know transmission resource occupation status information, and sends a first data packet by using a transmission resource unit that cannot be used to transmit a data packet; and reduces a latency for sending a data packet.

16 Claims, 5 Drawing Sheets

(56) References Cited

U.S. PATENT DOCUMENTS

2013/0010712 A1   1/2013   Kim et al.
2016/0219394 A1*  7/2016   Van Phan ............. H04W 76/14

FOREIGN PATENT DOCUMENTS

| CN | 102088775 A   | 6/2011  |
|----|---------------|---------|
| CN | 105430751 A   | 3/2016  |
| EP | 3151601 A1    | 4/2017  |
| WO | 2015180551 A1 | 12/2015 |

OTHER PUBLICATIONS

Ericsson,"NB-IoT—Remaining Issues for NPRACH",3GPP TSG RAN WG1 Meeting #84-bis R1-162779,Busan, Korea, Apr. 11-15, 2016 (7 pages).
J. Abdoli, M. Jia, J. Ma, "Filtered OFDM: A new waveform for future wireless systems", 2015 IEEE 16th International Workshop on Signal Processing Advances in Wireless Communications (SPAWC), pp. 66-70, Jul. 2015 (5 pages).
T. Wild, F. Schaich, Y. Chen, "5G air interface design based on Universal Filtered (UF-) OFDM", 2014 19th International Conference on Digital Signal Processing (DSP), pp. 699-704, Aug. 2014 (6 pages).
G. Fettweis, M. Krondorf, and S. Bittner, "GFDM—Generalized Frequency Division Multiplexing", 2009 IEEE 69th Vehicular Technology Conference (VTC Spring), pp. 1-4, Apr. 2009 (4 pages).
G. Berardinelli, F. M. L. Tavares, T. B. Sorensen, P. Mogensen, and K. Pajukoski, "On the potential of zero-tail DFT-spread-OFDM in 5G networks", 2014 IEEE 80th Vehicular Technology Conference (VTC Fall), pp. 1-8, Sep. 2014, (6 pages).
B. Muquet, Z. Wang, G. B. Giannakis, M. de Courville, and P. Duhamel, "Cyclic prefixing or zero padding for wireless multicarrier transmissions", IEEE Trans. Commun., vol. 50, pp. 2136-2148, Dec. 2002 (13 pages).
G. Cherubini, E. Eleftheriou, S. Oker, and J. M. Cioffi, "Filter bank modulation techniques for very high speed digital subscriber lines", IEEE Communications Magazine, vol. 38, No. 5, pp. 98-104, May 2000 (7 pages).
International Search Report dated Feb. 14, 2017 in corresponding International Patent Application PCT/CN2016/083779 (4 pages).
Extended European Search Report dated Mar. 3, 2018 in corresponding European Patent Application 16903387.5 (8 pages).

* cited by examiner

DATA TRANSMISSION METHOD, DEVICE, AND SYSTEM

CROSS-REFERENCE TO RELATED APPLICATIONS

This application is a continuation of International Application No. PCT/CN2016/083779, filed on May 28, 2016, the disclosure of which is hereby incorporated by reference in its entirety.

TECHNICAL FIELD

The present invention relates to the field of wireless communications technologies, and in particular, to a data transmission method, device, and system.

BACKGROUND

Currently, uplink scheduled transmission is mostly used in a communications system such as an LTE (Long Term Evolution, long term evolution) system. In an uplink scheduled transmission solution, when a terminal sends a relatively small uplink data packet to a base station, a proportion of a latency caused by information exchange between the terminal and the base station in an entire data packet transmission time increases, thereby increasing power consumption of the terminal.

To resolve a latency issue caused by information exchange, a new technical solution is proposed: an uplink non-scheduled transmission solution, also referred to as an uplink contention-based transmission solution. In this solution, when a terminal needs to send a data packet to a base station, the terminal does not initiate a random access request and wait for the base station to allocate a transmission resource, but directly and randomly selects a transmission resource unit and sends an uplink data packet to the base station. In the non-scheduled solution, the transmission resource unit is used in a contention manner, and the terminal does not need to exchange massive information with the base station.

However, a new issue in the uplink non-scheduled transmission solution is resource collision, that is, two or more terminals occupy a same transmission resource to send data packets. As a result, resource collision occurs between different data packets. When resource collision occurs, the base station may not decode data packets sent by all or some terminals, thereby causing retransmission of data packets and further increasing a latency for sending the data packets and power consumption of the terminals.

SUMMARY

The present invention provides a data transmission method, device, and system, to resolve a prior-art problem that a latency for sending a data packet is relatively large.

According to a first aspect, a data transmission method is provided, including:

obtaining, by a terminal, transmission resource occupation status information broadcast by a base station, where the transmission resource occupation status information includes a status that at least one transmission resource unit in a transmission resource within preset duration is occupied by another terminal; determining, based on the transmission resource occupation status information, a transmission resource unit used to send a first data packet, where a size of the first data packet is not greater than a maximum size of data that one transmission resource unit is allowed to carry; and finally sending, by the terminal, the first data packet by using the determined transmission resource unit.

The terminal can determine, based on the transmission resource occupation status information broadcast by the base station, the transmission resource unit used to send the first data packet. This avoids a problem in a non-scheduled solution that a terminal does not know transmission resource occupation status information, and sends a first data packet by using a transmission resource unit that cannot be used to transmit a data packet; reduces a possibility that a terminal transmits a first data packet by using a transmission resource that cannot be used to transmit a data packet; and reduces a latency for sending a data packet.

Based on the first aspect, optionally, the transmission resource occupation status information is information about at least one idle-state transmission resource unit in the transmission resource within the preset duration; the idle-state transmission resource unit is a transmission resource unit not occupied by another terminal; and the terminal determines, based on the transmission resource usage information, that the transmission resource unit used to send the first data packet is a transmission resource unit corresponding to information about an idle-state transmission resource unit.

The terminal can transmit the first data packet by using the idle-state transmission resource unit. This avoids sending the first data packet by using a transmission resource that cannot be used to transmit a data packet, improves a probability that the terminal successfully sends the first data packet to the base station, and reduces a latency for sending a data packet.

Based on the first aspect, optionally, the transmission resource occupation status information is information about all transmission resource units in the transmission resource within the preset duration, and information about a transmission resource unit occupied by another terminal; and the terminal determines, based on the transmission resource occupation status information, information about at least one transmission resource unit not occupied by another terminal; and the terminal determines that the transmission resource unit used to send the first data packet is a transmission resource unit corresponding to information about a transmission resource unit not occupied by another terminal.

Based on the first aspect, optionally, the transmission resource occupation status information is information about at least one target transmission resource unit in the transmission resource within the preset duration, and at least one pilot cyclic shift and/or orthogonal cover code allowed to be used when each target transmission resource unit is occupied to transmit a data packet; the target transmission resource unit is a transmission resource unit that has been occupied by another terminal; a quantity of other terminals occupying the target transmission resource unit is less than a maximum quantity of terminals that are allowed to simultaneously occupy one transmission resource unit; and the terminal determines, based on the transmission resource occupation status information, a transmission resource unit corresponding to information about a target transmission resource unit used to send the first data packet, and a pilot cyclic shift and/or an orthogonal cover code used to send the first data packet; and sends the first data packet by using the determined transmission resource unit and the determined pilot cyclic shift and/or orthogonal cover code used to send the first data packet.

Based on the first aspect, optionally, the transmission resource occupation status information is information about at least one transmission resource unit that has been occupied by another terminal, a maximum quantity of terminals that are allowed to simultaneously occupy one transmission resource unit to transmit data packets, a quantity of other terminals occupying each transmission resource unit, and information about a pilot cyclic shift and/or an orthogonal cover code allowed to be used when a data packet is transmitted by using each transmission resource unit that has been occupied by another terminal; and the terminal determines, based on the transmission resource occupation status information, that the transmission resource unit used to send the first data packet is a target transmission resource unit, where the target transmission resource unit is a transmission resource unit that has been occupied by another terminal, and a quantity of other terminals occupying the target transmission resource unit is less than the maximum quantity of terminals that are allowed to simultaneously occupy one transmission resource unit; and sends the first data packet by using the determined transmission resource unit and the determined pilot cyclic shift and/or orthogonal cover code used to send the first data packet.

Based on the first aspect, optionally, the first data packet includes first information, the first information is used by the base station to determine a quantity of subsequent data packets sent by the terminal after the terminal sends the first data packet, and a size of each subsequent data packet is not greater than the maximum size of data that one transmission resource unit is allowed to carry.

Based on the first aspect, optionally, the first information is a total quantity of the first data packet and the subsequent data packets sent by the terminal; or the first information is the quantity of subsequent data packets sent by the terminal after the terminal sends the first data packet.

Based on the first aspect, optionally, when the quantity of subsequent data packets sent by the terminal after the terminal sends the first data packet is greater than a specified threshold, the terminal sends the subsequent data packets on a transmission resource unit allocated by the base station.

When the quantity of subsequent data packets sent by the terminal after the terminal sends the first data packet is greater than the specified threshold, transmission changes to uplink scheduled transmission. Compared with non-scheduled transmission, this improves data packet transmission efficiency when a relatively large quantity of data packets are sent.

Based on the first aspect, optionally, the terminal sends the subsequent data packets by using a transmission resource unit that is allocated by the base station and that is used for uplink scheduled transmission.

Based on the first aspect, optionally, when the quantity of subsequent data packets sent by the terminal after the terminal sends the first data packet is less than a specified threshold, based on the transmission resource unit occupied to send the first data packet and the pilot cyclic shift and/or the orthogonal cover code used to send the first data packet, and based on a predetermined relationship between a transmission resource unit that needs to be occupied to send each subsequent data packet and the transmission resource unit occupied to send the first data packet, and a predetermined relationship between a pilot cyclic shift and/or an orthogonal cover code that need/needs to be used to send each subsequent data packet and the pilot cyclic shift and/or the orthogonal cover code used to send the first data packet, the terminal determines a transmission resource unit used to send each subsequent data packet, and a pilot cyclic shift and/or an orthogonal cover code used to send each subsequent data packet; and sends each subsequent data packet by using the transmission resource unit used to send each subsequent data packet, and the pilot cyclic shift and/or the orthogonal cover code used to send each subsequent data packet.

A transmission resource unit and a pilot cyclic shift and/or an orthogonal cover code that are used to send a subsequent data packet is determined based on the predetermined relationship between a transmission resource unit that needs to be occupied to send each subsequent data packet and the transmission resource unit occupied to send the first data packet, and the predetermined relationship between a pilot cyclic shift and/or an orthogonal cover code that need/needs to be used to send each subsequent data packet and the pilot cyclic shift and/or the orthogonal cover code used to send the first data packet. This simplifies a manner of determining a transmission resource unit and a pilot cyclic shift and/or an orthogonal cover code that are used to send a subsequent data packet.

Based on the first aspect, optionally, the first data packet further includes second information, and the second information is a relationship between a transmission resource unit that needs to be occupied to send each subsequent data packet and the transmission resource unit occupied to send the first data packet, and a relationship between a pilot cyclic shift and/or an orthogonal cover code used to send each subsequent data packet and the pilot cyclic shift and/or the orthogonal cover code used to send the first data packet; and if a quantity of subsequent data packets that need to be further sent by the terminal after the terminal sends the first data packet is less than a specified threshold, the following operations are performed for each subsequent data packet:

based on the transmission resource unit occupied to send the first data packet and the pilot cyclic shift and/or the orthogonal cover code used to send the first data packet, and based on the second information, determining, by the terminal, a transmission resource unit used to send the subsequent data packet, and a pilot cyclic shift and/or an orthogonal cover code used to send the subsequent data packet; and sending the subsequent data packet by using the determined transmission resource unit and the determined pilot cyclic shift and/or orthogonal cover code.

Based on the first aspect, optionally, if the terminal further sends a subsequent data packet after sending the first data packet, before the terminal sends the first data packet, based on the preset relationship between a transmission resource unit occupied to send each subsequent data packet and the transmission resource unit occupied to send the first data packet, the terminal determines a transmission resource unit occupied to send each subsequent data packet when the transmission resource unit is occupied to send the first data packet, where any transmission resource unit occupied to send each subsequent data packet satisfies that a quantity of other terminals occupying the transmission resource unit occupied to send the subsequent data packet is less than the maximum quantity of terminals that are allowed to simultaneously occupy one transmission resource unit.

An occupation status of a transmission resource unit occupied to send a subsequent data packet needs to be considered when the transmission resource unit used to send the first data packet is determined. When a subsequent data packet is further sent after the first data packet is sent, this avoids a case in which a transmission resource unit that is used to transmit a subsequent data packet and that is determined based on the relationship between a transmission resource unit occupied to send each subsequent data packet and the transmission resource unit occupied to send the first data packet cannot be used to transmit a subsequent data packet; and improves a possibility of successfully sending a subsequent data packet.

According to a second aspect, a data transmission method is provided, including: determining, by a base station, transmission resource occupation status information, where the transmission resource occupation status information includes a status that at least one transmission resource unit in a transmission resource within preset duration is occupied by a terminal under control of the base station, and a size of the data packet is not greater than a maximum size of data that one transmission resource unit is allowed to carry; and broadcasting the transmission resource occupation status information.

Based on the second aspect, optionally, the transmission resource occupation status information is information about at least one idle-state transmission resource unit in the transmission resource within the preset duration, and the idle-state transmission resource unit is a transmission resource unit not occupied by another terminal.

Based on the second aspect, optionally, the transmission resource occupation status information is information about all transmission resource units in the transmission resource within the preset duration, and information about a transmission resource unit occupied by another terminal.

Based on the second aspect, optionally, the transmission resource occupation status information is information about at least one target transmission resource unit in the transmission resource within the preset duration, and at least one pilot cyclic shift and/or orthogonal cover code allowed to be used when each target transmission resource unit is occupied to transmit a data packet, the target transmission resource unit is a transmission resource unit that has been occupied by another terminal, and a quantity of other terminals occupying the target transmission resource unit is less than a maximum quantity of terminals that are allowed to simultaneously occupy one transmission resource unit.

Based on the second aspect, optionally, the transmission resource occupation status information is information about at least one transmission resource unit that has been occupied by another terminal, a maximum quantity of terminals that are allowed to simultaneously occupy one transmission resource unit to transmit data packets, a quantity of other terminals occupying each transmission resource unit, and information about a pilot cyclic shift and/or an orthogonal cover code allowed to be used when a data packet is transmitted by using each transmission resource unit that has been occupied by another terminal.

Based on the second aspect, optionally, after broadcasting the transmission resource occupation status information, the base station receives a first data packet that is sent by any terminal under control by using a transmission resource unit determined based on the transmission resource occupation status information, where the first data packet includes first information, the first information is used to indicate, to the base station, a quantity of subsequent data packets sent by the terminal after the terminal sends the first data packet, and a size of the first data packet and each subsequent data packet is not greater than the maximum size of data that one transmission resource unit is allowed to carry; determines, based on the first information, the quantity of subsequent data packets sent by the terminal after the terminal sends the first data packet; and when it is determined that the quantity of subsequent data packets exceeds a preset threshold, allocates a transmission resource unit used to send the subsequent data packets.

Based on the second aspect, optionally, the first information is a total quantity of the first data packet and the subsequent data packets sent by the terminal; or the first information is the quantity of subsequent data packets sent by the terminal after the terminal sends the first data packet.

Based on the second aspect, optionally, the base station allocates, to the terminal from a transmission resource used for uplink scheduling, a transmission resource unit used to send the subsequent data packets.

Based on the second aspect, optionally, the base station determines the transmission resource unit occupied by the terminal to send the first data packet, and a pilot cyclic shift and/or an orthogonal cover code used to send the first data packet; if it is determined that the quantity of subsequent data packets sent by the terminal after the terminal sends the first data packet does not exceed a threshold, based on a predetermined relationship between a transmission resource unit occupied to send each subsequent data packet and the transmission resource unit occupied by the first data packet, and a predetermined relationship between a pilot cyclic shift and/or an orthogonal cover code used to send each subsequent data packet and the pilot cyclic shift and/or the orthogonal cover code used to send the first data packet, determines a transmission resource unit occupied when the terminal sends each subsequent data packet, and a pilot cyclic shift and/or an orthogonal cover code used when the terminal sends each subsequent data packet; and receives each subsequent data packet by using the determined transmission resource unit occupied when the terminal sends each subsequent data packet, and the determined pilot cyclic shift and/or orthogonal cover code used when the terminal sends each subsequent data packet.

Based on the second aspect, optionally, the first data packet further includes second information; the second information is used to indicate a relationship between a transmission resource unit occupied when the terminal sends each subsequent data packet and the transmission resource unit occupied to send the first data packet, and a relationship between a pilot cyclic shift and/or an orthogonal cover code used to send each subsequent data packet and the pilot cyclic shift and/or the orthogonal cover code used to send the first data packet; and the base station determines, based on the second information, a transmission resource unit occupied by the terminal to send each subsequent data packet, and a pilot cyclic shift and/or an orthogonal cover code used to send each subsequent data packet; and receives each subsequent data packet by using the transmission resource unit occupied by the terminal to send each subsequent data packet and the pilot cyclic shift and/or orthogonal cover code used to send each subsequent data packet.

According to a third aspect, a data transmission terminal is provided, including a processing unit and a transceiver unit. The transceiver unit is configured to obtain transmission resource occupation status information broadcast by a base station, where the transmission resource occupation status information includes a status that at least one transmission resource unit in a transmission resource within preset duration is occupied by another terminal. The processing unit is configured to determine, based on the transmission resource occupation status information, a transmission resource unit used to send a first data packet, where a size of the first data packet is not greater than a maximum size of data that one transmission resource unit is allowed to carry. Finally, the transceiver unit is further configured to send the first data packet by using the determined transmission resource unit.

Based on the third aspect, optionally, the transmission resource occupation status information is information about at least one idle-state transmission resource unit in the transmission resource within the preset duration; the idle-state transmission resource unit is a transmission resource unit not occupied by another terminal; and when determining, based on the transmission resource occupation status information, the transmission resource unit used to send the first data packet, the processing unit is specifically configured to determine, based on the transmission resource usage information, that the transmission resource unit used to send the first data packet is a transmission resource unit corresponding to information about an idle-state transmission resource unit.

Based on the third aspect, optionally, the transmission resource occupation status information is information about all transmission resource units in the transmission resource within the preset duration, and information about a transmission resource unit occupied by another terminal; the processing unit determines, based on the transmission resource occupation status information, information about at least one transmission resource unit not occupied by another terminal; and when determining, based on the transmission resource occupation status information, the transmission resource unit used to send the first data packet, the processing unit is specifically configured to determine that the transmission resource unit used to send the first data packet is a transmission resource unit corresponding to information about a transmission resource unit not occupied by another terminal.

Based on the third aspect, optionally, the transmission resource occupation status information is information about at least one target transmission resource unit in the transmission resource within the preset duration, and at least one pilot cyclic shift and/or orthogonal cover code allowed to be used when each target transmission resource unit is occupied to transmit a data packet; the target transmission resource unit is a transmission resource unit that has been occupied by another terminal; a quantity of other terminals occupying the target transmission resource unit is less than a maximum quantity of terminals that are allowed to simultaneously occupy one transmission resource unit; the processing unit is specifically configured to determine, based on the transmission resource occupation status information, a transmission resource unit corresponding to information about a target transmission resource unit used to send the first data packet, and a pilot cyclic shift and/or an orthogonal cover code used to send the first data packet; and the transceiver unit is specifically configured to send the first data packet by using the determined transmission resource unit and the determined pilot cyclic shift and/or orthogonal cover code used to send the first data packet.

Based on the third aspect, optionally, the transmission resource occupation status information is information about at least one transmission resource unit that has been occupied by another terminal, a maximum quantity of terminals that are allowed to simultaneously occupy one transmission resource unit to transmit data packets, a quantity of other terminals occupying each transmission resource unit, and information about a pilot cyclic shift and/or an orthogonal cover code allowed to be used when a data packet is transmitted by using each transmission resource unit that has been occupied by another terminal; the processing unit is specifically configured to determine, based on the transmission resource occupation status information, that the transmission resource unit used to send the first data packet is a target transmission resource unit, where the target transmission resource unit is a transmission resource unit that has been occupied by another terminal, and a quantity of other terminals occupying the target transmission resource unit is less than the maximum quantity of terminals that are allowed to simultaneously occupy one transmission resource unit; and the transceiver unit is specifically configured to send the first data packet by using the determined transmission resource unit and the determined pilot cyclic shift and/or orthogonal cover code used to send the first data packet.

Based on the third aspect, optionally, the first data packet includes first information, the first information is used by the base station to determine a quantity of subsequent data packets sent by the terminal after the terminal sends the first data packet, and a size of each subsequent data packet is not greater than the maximum size of data that one transmission resource unit is allowed to carry.

Based on the third aspect, optionally, the first information is a total quantity of the first data packet and the subsequent data packets sent by the transceiver unit; or the first information is the quantity of subsequent data packets sent by the transceiver unit after the transceiver unit sends the first data packet.

Based on the third aspect, optionally, when the quantity of subsequent data packets sent by the transceiver unit after the transceiver unit sends the first data packet is greater than a specified threshold, the transceiver unit is further configured to send the subsequent data packets on a transmission resource unit allocated by the base station.

Based on the third aspect, optionally, the transceiver unit sends the subsequent data packets by using a transmission resource unit that is allocated by the base station and that is used for uplink scheduled transmission.

Based on the third aspect, optionally, when the quantity of subsequent data packets sent by the transceiver unit after the transceiver unit sends the first data packet is less than a specified threshold, based on the transmission resource unit occupied to send the first data packet and the pilot cyclic shift and/or the orthogonal cover code used to send the first data packet, and based on a predetermined relationship between a transmission resource unit that needs to be occupied to send each subsequent data packet and the transmission resource unit occupied to send the first data packet, and a predetermined relationship between a pilot cyclic shift and/or an orthogonal cover code that need/needs to be used to send each subsequent data packet and the pilot cyclic shift and/or the orthogonal cover code used to send the first data packet, the processing unit determines a transmission resource unit used to send each subsequent data packet, and a pilot cyclic shift and/or an orthogonal cover code used to send each subsequent data packet; and the transceiver unit is further configured to send each subsequent data packet by using the transmission resource unit used to send each subsequent data packet, and the pilot cyclic shift and/or the orthogonal cover code used to send each subsequent data packet.

Based on the third aspect, optionally, the first data packet further includes second information, and the second information is a relationship between a transmission resource unit that needs to be occupied to send each subsequent data packet and the transmission resource unit occupied to send the first data packet, and a relationship between a pilot cyclic shift and/or an orthogonal cover code used to send each subsequent data packet and the pilot cyclic shift and/or the orthogonal cover code used to send the first data packet; and if the quantity of subsequent data packets that need to be further sent by the transceiver unit after the transceiver unit sends the first data packet is less than a specified threshold, the following operations are performed for each subsequent data packet:

the processing unit is further configured to: based on the transmission resource unit occupied to send the first data packet and the pilot cyclic shift and/or the orthogonal cover code used to send the first data packet, and based on the second information, determine a transmission resource unit used to send the subsequent data packet, and a pilot cyclic shift and/or an orthogonal cover code used to send the subsequent data packet; and the transceiver unit is further configured to send the subsequent data packet by using the determined transmission resource unit and the determined pilot cyclic shift and/or orthogonal cover code.

Based on the third aspect, optionally, if the transceiver unit further sends a subsequent data packet after sending the first data packet, before the transceiver unit sends the first data packet, based on the preset relationship between a transmission resource unit occupied to send each subsequent data packet and the transmission resource unit occupied to send the first data packet, the processing unit determines a transmission resource unit occupied to send each subsequent data packet when the transmission resource unit is occupied to send the first data packet, where any transmission resource unit occupied to send each subsequent data packet satisfies that a quantity of other terminals occupying the transmission resource unit occupied to send the subsequent data packet is less than the maximum quantity of terminals that are allowed to simultaneously occupy one transmission resource unit.

According to a fourth aspect, a data transmission base station is provided, including a processing unit and a transceiver unit. The processing unit is configured to determine transmission resource occupation status information, where the transmission resource occupation status information includes a status that at least one transmission resource unit in a transmission resource within preset duration is occupied by a terminal under control of the base station, and a size of the data packet is not greater than a maximum size of data that one transmission resource unit is allowed to carry. The transceiver unit is configured to broadcast the transmission resource occupation status information.

Based on the fourth aspect, optionally, the transmission resource occupation status information is information about at least one idle-state transmission resource unit in the transmission resource within the preset duration, and the idle-state transmission resource unit is a transmission resource unit not occupied by another terminal.

Based on the fourth aspect, optionally, the transmission resource occupation status information is information about all transmission resource units in the transmission resource within the preset duration, and information about a transmission resource unit occupied by another terminal.

Based on the fourth aspect, optionally, the transmission resource occupation status information is information about at least one target transmission resource unit in the transmission resource within the preset duration, and at least one pilot cyclic shift and/or orthogonal cover code allowed to be used when each target transmission resource unit is occupied to transmit a data packet, the target transmission resource unit is a transmission resource unit that has been occupied by another terminal, and a quantity of other terminals occupying the target transmission resource unit is less than a maximum quantity of terminals that are allowed to simultaneously occupy one transmission resource unit.

Based on the fourth aspect, optionally, the transmission resource occupation status information is information about at least one transmission resource unit that has been occupied by another terminal, a maximum quantity of terminals that are allowed to simultaneously occupy one transmission resource unit to transmit data packets, a quantity of other terminals occupying each transmission resource unit, and information about a pilot cyclic shift and/or an orthogonal cover code allowed to be used when a data packet is transmitted by using each transmission resource unit that has been occupied by another terminal.

Based on the fourth aspect, optionally, the transceiver unit is further configured to: after broadcasting the transmission resource occupation status information, receive a first data packet that is sent by any terminal under control by using a transmission resource unit determined based on the transmission resource occupation status information, where the first data packet includes first information, the first information is used to indicate, to the base station, a quantity of subsequent data packets sent by the terminal after the terminal sends the first data packet, and a size of the first data packet and each subsequent data packet is not greater than the maximum size of data that one transmission resource unit is allowed to carry; and the processing unit is further configured to: determine, based on the first information, the quantity of subsequent data packets sent by the terminal after the terminal sends the first data packet; and when it is determined that the quantity of subsequent data packets exceeds a preset threshold, allocate, to the terminal, a transmission resource unit used to send the subsequent data packets.

Based on the fourth aspect, optionally, the first information is a total quantity of the first data packet and the subsequent data packets sent by the terminal; or the first information is the quantity of subsequent data packets sent by the terminal after the terminal sends the first data packet.

Based on the fourth aspect, optionally, when allocating, to the terminal, the transmission resource unit used to send the subsequent data packets, the processing unit is specifically configured to allocate, to the terminal from a transmission resource used for uplink scheduled transmission, a transmission resource unit used to send the subsequent data packets.

Based on the fourth aspect, optionally, the processing unit is further configured to: determine the transmission resource unit occupied by the terminal to send the first data packet, and a pilot cyclic shift and/or an orthogonal cover code used to send the first data packet; and if it is determined that a quantity of subsequent data packets sent by the terminal after the terminal sends the first data packet does not exceed a threshold, based on a predetermined relationship between a transmission resource unit occupied to send each subsequent data packet and the transmission resource unit occupied by the first data packet, and a predetermined relationship between a pilot cyclic shift and/or an orthogonal cover code used to send each subsequent data packet and the pilot cyclic shift and/or the orthogonal cover code used to send the first data packet, determine a transmission resource unit occupied when the terminal sends each subsequent data packet, and a pilot cyclic shift and/or an orthogonal cover code used when the terminal sends each subsequent data packet; and the transceiver unit is further configured to receive each subsequent data packet by using the determined transmission resource unit occupied when the terminal sends each subsequent data packet, and the determined pilot cyclic shift and/or orthogonal cover code used when the terminal sends each subsequent data packet.

Based on the fourth aspect, optionally, the first data packet further includes second information, and the second information is used to indicate a relationship between a transmission resource unit occupied when the terminal sends each subsequent data packet and the transmission resource unit occupied to send the first data packet, and a relationship between a pilot cyclic shift and/or an orthogonal cover code used to send each subsequent data packet and the pilot cyclic shift and/or the orthogonal cover code used to send the first data packet;

the processing unit is further configured to determine, based on the second information, a transmission resource unit occupied by the terminal to send each subsequent data packet, and a pilot cyclic shift and/or an orthogonal cover code used to send each subsequent data packet; and the transceiver unit is further configured to receive each subsequent data packet by using the transmission resource unit occupied by the terminal to send each subsequent data packet and the pilot cyclic shift and/or orthogonal cover code used to send each subsequent data packet.

According to a fifth aspect, a network-side data transmission system is provided, including the base station according to any one of the technical solutions of the fourth aspect.

According to a sixth aspect, a data transmission network system is provided, including the terminal according to any one of the technical solutions of the third aspect, and the base station according to any one of the technical solutions of the fourth aspect.

According to a seventh aspect, a data transmission terminal is provided, including a processor, a transceiver, and a memory. The memory is configured to store data that needs to be transmitted. The transceiver is configured to send and receive data that needs to be transmitted. The processor is configured to execute a program for any designed data transmission technical solution in the first aspect.

According to an eighth aspect, a data transmission base station is provided, including a processor, a transceiver, and a memory. The memory is configured to store data that needs to be transmitted. The processor executes a program for any designed data transmission technical solution in the second aspect. The transceiver is configured to send and receive data that needs to be transmitted. The processor is configured to execute a program for any designed data transmission technical solution in the second aspect.

According to a ninth aspect, a data transmission chip is provided, including an input/output interface, at least one processor, a memory, a bus, and the like. The input/output interface, the at least one processor, and the memory are connected to each other by using the bus. The memory is configured to store data that needs to be transmitted. The processor executes a program for any designed data transmission technical solution in the first aspect. The input/output interface is configured to send and receive data that needs to be transmitted. The processor is configured to execute a program for any designed data transmission technical solution in the first aspect.

According to a tenth aspect, a data transmission chip is provided, including an input/output interface, at least one processor, a memory, a bus, and the like. The input/output interface, the at least one processor, and the memory are connected to each other by using the bus. The memory is configured to store data that needs to be transmitted. The processor executes a program for any designed data transmission technical solution in the second aspect. The input/output interface is configured to send and receive data that needs to be transmitted. The processor is configured to execute a program for any designed data transmission technical solution in the second aspect.

According to an eleventh aspect, a computer-readable storage medium is provided. The computer-readable storage medium is configured to store a computer software instruction used to perform any designed technical solution in the first aspect or the second aspect, and includes a program designed to perform any designed technical solution in the first aspect or any designed technical solution in the second aspect.

DESCRIPTION OF EMBODIMENTS

To make the objectives, technical solutions, and advantages of the embodiments of the present invention clearer, the following further describes the embodiments of the present invention in detail with reference to the accompanying drawings in this specification.

Figure 1:
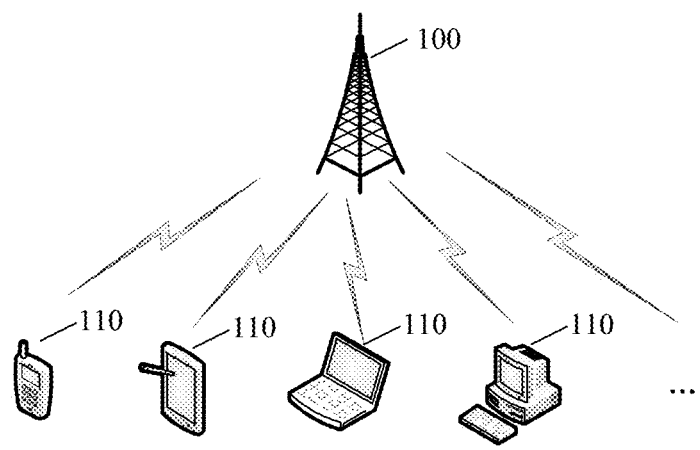
FIG. 1 is an architectural diagram of a communications system applied to an embodiment of the present invention.

FIG. 1 is an architectural diagram of a communications system applied to an embodiment of the present invention. The communications system includes a base station 100 and at least one terminal 110. The base station 100 has a plurality of receive antennas, and the terminal 110 has at least one transmit antenna. The base station communicates with the terminal by using an uplink air interface technology. The uplink air interface technology includes but is not limited to an air interface technology with a time-frequency structure, for example, 4G (including an FDD (Frequency Division Duplex, frequency division duplex) LTE (Long Term Evolution, Long Term Evolution) system, and a TDD (Time Division Duplex, time division duplex) LTE system), 4.5G or 5G. A downlink air interface technology is not limited in this embodiment of the present invention.

The base station in this embodiment of the present invention is a node that is in a cellular network and that manages a terminal and controls a terminal to send and receive data. The terminal in this embodiment of the present invention is user equipment that is in a cellular network and that communicates with a base station, including but not limited to a smartphone, a tablet computer, a notebook computer, and the like.

Figure 2:
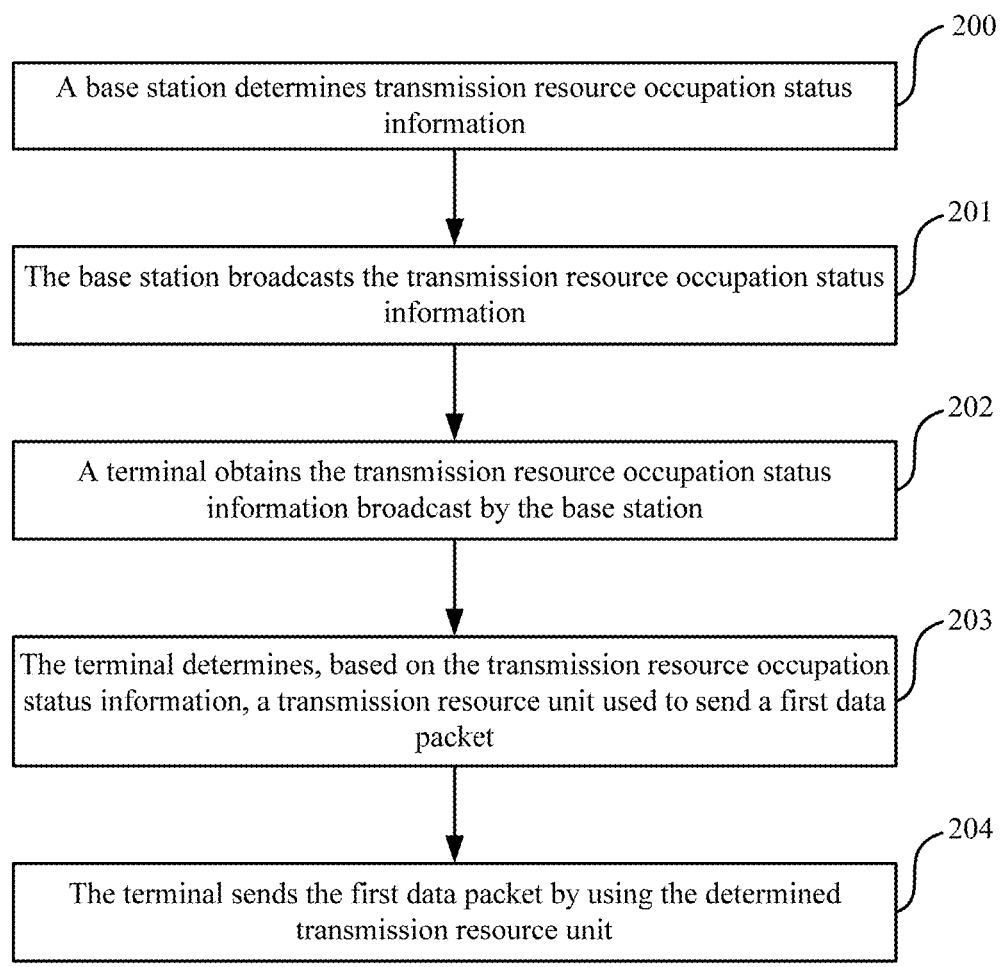
FIG. 2 is a schematic flowchart of a data transmission method according to an embodiment of the present invention.

As shown in FIG. 2, a data transmission method in an embodiment of the present invention includes the following steps.

Step 200: A base station determines transmission resource occupation status information, where the transmission resource occupation status information includes a status that at least one transmission resource unit in a transmission resource within preset duration is occupied by a terminal under control of the base station, and a size of a first data packet is not greater than a maximum size of a data packet that one RB is allowed to carry.

It should be noted that, in an LTE system, a transmission resource is a time-frequency resource, and a transmission resource unit is an RB (Resource Block, resource block).

Specifically, an RB in the LTE system has time effectiveness. For example, two RBs, namely, an RB 1 and an RB 2, belong to one subcarrier, and the RB 1 is ahead of the RB 2. After a time segment corresponding to the RB 1 elapses, the RB 1 expires and can be no longer used to transmit a data packet, and a data packet is transmitted on the RB 2. Therefore, RB occupation status information determined by a base station is RB occupation status information within preset duration. The base station may periodically determine RB occupation status information.

The preset duration may be set depending on an actual situation.

In this embodiment of the present invention, the terminal under control of the base station is a terminal that belongs to a cell in which the base station is located.

It should be noted that, that a transmission resource unit is occupied by a terminal may be: the base station allocates the transmission resource unit to the terminal, and the terminal transmits data by using the allocated transmission resource unit; or may be: the terminal obtains the transmission resource unit in a manner of contention, and then transmits data by using the transmission resource unit.

Step 201: The base station broadcasts the transmission resource occupation status information.

Step 202: A terminal obtains the transmission resource occupation status information broadcast by the base station.

Step 203: The terminal determines, based on the transmission resource occupation status information, a transmission resource unit used to send the first data packet.

Step 204: The terminal sends the first data packet by using the determined transmission resource unit.

Figure 3:
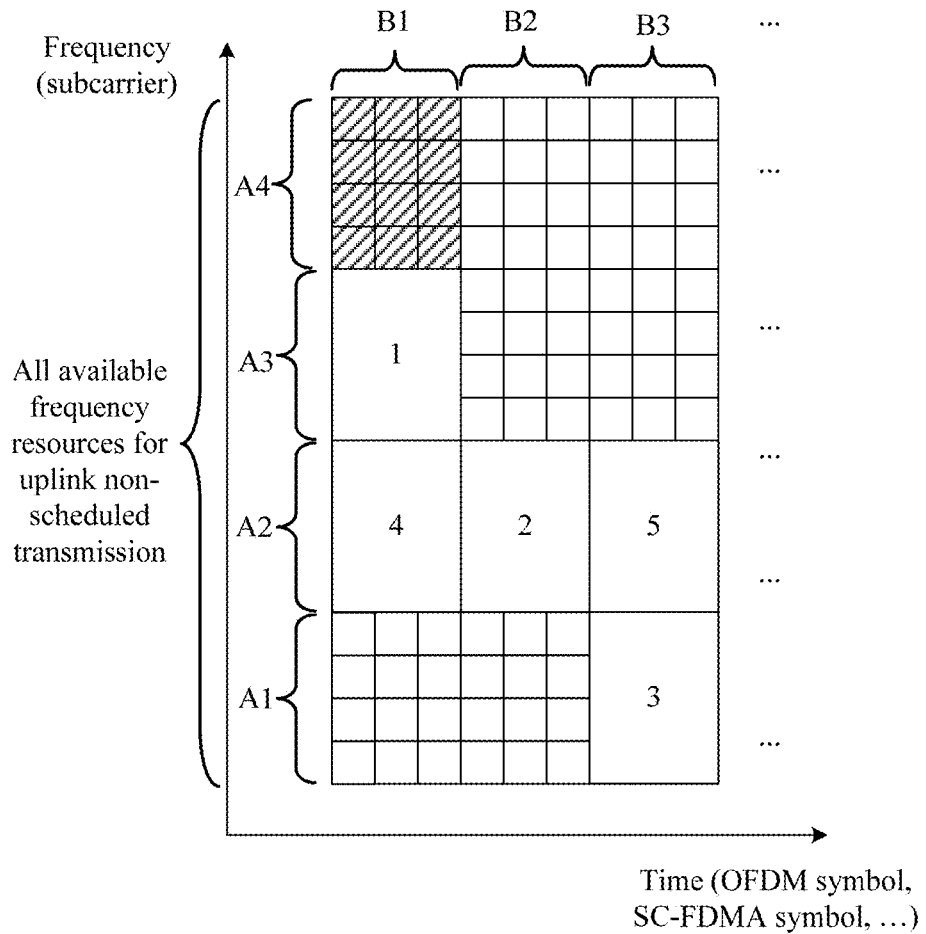
FIG. 3 is a schematic diagram of an RB according to an embodiment of the present invention.

When the transmission resource is a time-frequency resource, as shown in FIG. 3, A4B1 indicates an RB, and each block indicates an RE (Resource Element, resource element). The RE is a smallest time-frequency resource unit, occupies one subcarrier in frequency domain, and occupies one OFDM symbol in time domain. The RB is a smallest physical resource unit that can be scheduled by a wireless-side data channel, and is also a smallest scheduling unit. Both uplink and downlink service channels perform scheduling in a unit of RB.

In step 202, the terminal may obtain, when determining that the first data packet needs to be sent, transmission resource occupation status information broadcast by the base station; or may monitor, in real time, transmission resource occupation status information broadcast by the base station, and after obtaining latest transmission resource occupation status information, overwrite previously obtained RB occupation status information.

In this embodiment of the present invention, optionally, the transmission resource occupation status information is information about at least one idle-state transmission resource unit in the transmission resource within the preset duration. The idle-state transmission resource unit is a transmission resource unit not occupied by another terminal. The terminal determines, based on the transmission resource usage information, that the transmission resource unit used to send the first data packet is a transmission resource unit corresponding to information about an idle-state transmission resource unit.

It should be noted that information about a transmission resource unit may be a number of the transmission resource unit, an index of the transmission resource unit, or indication information of the transmission resource unit.

In addition, when information about a transmission resource unit is indication information of the transmission resource unit, indication may be performed in a manner of bit mapping. Specifically, for a specific transmission resource unit, 0 indicates that the transmission resource unit is not occupied by a terminal, and 1 indicates that the transmission resource unit is occupied by a terminal.

It should be understood that, when a transmission resource unit is a time-frequency resource, the base station pre-allocates, for each RB, a pilot cyclic shift and/or an orthogonal cover code allowed to be used when a data packet is transmitted by using the RB. In the prior art, a base station allocates a same pilot cyclic shift and/or orthogonal cover code for RBs. It should be noted that the base station may alternatively allocate different pilot cyclic shifts and/or orthogonal cover codes for RBs.

When a plurality of data packets are transmitted by using a same transmission resource unit, the pilot cyclic shift and the orthogonal cover code are used to distinguish between different data packets, so that the base station can correctly receive a plurality of data packets by using a same transmission resource unit.

For example, the RB 1 is allowed to be occupied by a maximum of four terminals to transmit data packets. When the RB 1 is occupied by four terminals to separately transmit data packets, in other words, the RB 1 is used to simultaneously transmit four data packets and the four data packets come from different terminals, different pilot cyclic shifts and/or orthogonal cover codes need to be set for the four data packets, so that the base station can correctly receive the four data packets.

When the base station allocates a same pilot cyclic shift and/or orthogonal cover code for transmission resource units (for example, RBs), the pilot cyclic shift and/or the orthogonal cover code may be directly prestored in the terminal, and the base station does not need to send a pilot cyclic shift and/or an orthogonal cover code to the terminal.

When the transmission resource unit occupied to send the first data packet is a transmission resource unit corresponding to information about an idle-state transmission resource unit, the terminal sends the first data packet by using any one of pilot cyclic shifts and/or orthogonal cover codes that are allocated by the base station for the RB.

Figure 4:
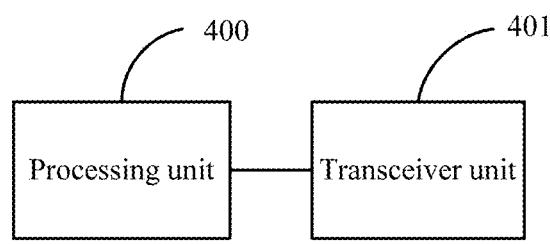
FIG. 4 is a schematic structural diagram of a data transmission terminal according to an embodiment of the present invention.

When information about a transmission resource unit is a number of the transmission resource unit, the number of the transmission resource unit may be a number that is set by the base station according to a preset numbering rule to distinguish between transmission resource units. For example, a transmission resource unit is an RB. As shown in FIG. 4, a number of an RB corresponding to A4B3 may be set to A4B3; or A4B3 may be corresponding to a numeric (for example, 1), and the number of the RB is set to 1.

Assuming that an RB corresponding to a number A4B1 and an RB corresponding to a number A3B2 are RBs not occupied by another terminal, the first data packet may be sent by using one of the two RBs.

Optionally, the transmission resource occupation status information is information about all transmission resource units in the transmission resource within the preset duration, and information about a transmission resource unit occupied by another terminal. The terminal determines, based on the transmission resource occupation status information, information about at least one transmission resource unit not occupied by another terminal.

It should be understood that the information about the transmission resource unit not occupied by the another terminal is information that is in the information about all the transmission resource units in the transmission resource within the preset duration and that is different from information of the transmission resource unit occupied by the another terminal.

Optionally, the transmission resource occupation status information is information about at least one target transmission resource unit in the transmission resource within the preset duration, and at least one pilot cyclic shift and/or orthogonal cover code allowed to be used when each target transmission resource unit is occupied to transmit a data packet. The target transmission resource unit is a transmission resource unit that has been occupied by another terminal. A quantity of other terminals occupying the target transmission resource unit is less than a maximum quantity of terminals that are allowed to simultaneously occupy one transmission resource unit. The terminal determines, based on the transmission resource occupation status information, a transmission resource unit corresponding to information about a target transmission resource unit used to send the first data packet, and a pilot cyclic shift and/or an orthogonal cover code used to send the first data packet; and sends the first data packet by using the determined transmission resource unit and the determined pilot cyclic shift and/or orthogonal cover code used to send the first data packet.

It is assumed that the maximum quantity of terminals that are allowed to simultaneously occupy one transmission resource unit is 4; pilot cyclic shifts include a pilot cyclic shift 1, a pilot cyclic shift 2, a pilot cyclic shift 3, and a pilot cyclic shift 4; and a target transmission resource unit 1 has been simultaneously occupied by three terminals. If the pilot cyclic shift 1, the pilot cyclic shift 2, the pilot cyclic shift 3 have been used, and if the terminal determines to send the first data packet by using the target transmission resource unit 1, the first data packet is sent on the target transmission resource unit by using the pilot cyclic shift 4.

When at least two unused pilot cyclic shifts are included, any one of the at least two unused pilot cyclic shifts may be selected.

A manner of determining an orthogonal cover code is similar to the manner of determining a cyclic shift. Details are not described herein.

It should be noted that the maximum quantity of terminals that are allowed to simultaneously occupy one transmission resource unit is related to a quantity of receive antennas of the base station, and channel correlation on the base station side.

Optionally, the transmission resource occupation status information is information about at least one transmission resource unit that has been occupied by another terminal, a maximum quantity of terminals that are allowed to simultaneously occupy one transmission resource unit to transmit data packets, a quantity of other terminals occupying each transmission resource unit, and information about a pilot cyclic shift and/or an orthogonal cover code allowed to be used when a data packet is transmitted by using each transmission resource unit that has been occupied by another terminal. The terminal determines, based on the transmission resource occupation status information, that the transmission resource unit used to send the first data packet is a target transmission resource unit, where the target transmission resource unit is a transmission resource unit that has been occupied by another terminal, and a quantity of other terminals occupying the target transmission resource unit is less than the maximum quantity of terminals that are allowed to simultaneously occupy one transmission resource unit; and sends the first data packet by using the determined transmission resource unit and the determined pilot cyclic shift and/or orthogonal cover code used to send the first data packet.

It should be noted that the maximum quantity of terminals that are allowed to simultaneously occupy one transmission resource unit is the same for each transmission resource unit and is a fixed value; therefore, the maximum quantity of terminals that are allowed to simultaneously occupy one RB may be preset in a terminal.

When the transmission resource occupation status information includes information about at least one idle-state transmission resource unit, information about at least one target transmission resource unit, and at least one pilot cyclic shift and/or orthogonal cover code allowed to be used when a data packet is transmitted by using each target transmission resource unit, the terminal selects information about a transmission resource unit based on a maximum quantity of remaining terminals allowed to occupy a transmission resource unit, and sends the first data packet by using a transmission resource unit corresponding to the selected information about a transmission resource unit.

In addition, in this embodiment of the present invention, the transmission resource occupation status information may alternatively be occupation status information of each transmission resource unit within the preset duration. The terminal selects, based on the transmission resource occupation status information, a transmission resource unit that can be used to transmit the first data packet. The transmission resource unit that can be used to transmit the first data packet satisfies that a quantity of other terminals occupying the transmission resource unit is less than the maximum quantity of terminals that are allowed to simultaneously occupy one transmission resource unit.

When none of transmission resource units within the preset duration can be used to transmit a data packet, the base station broadcasts information indicating that all the transmission resource units within the preset duration are unavailable. When the terminal needs to send a data packet within the preset duration, the terminal does not send the data packet that needs to be sent, but waits for transmission resource occupation status information broadcast by the base station in a next time segment.

When the terminal needs to send a plurality of data packets, optionally, the first data packet includes first information. The first information is used by the base station to determine a quantity of subsequent data packets sent by the terminal after the terminal sends the first data packet. A size of a subsequent data packet is not greater than the maximum size of a data packet that one transmission resource unit is allowed to carry.

Optionally, the first information is a total quantity of the first data packet and the subsequent data packets sent by the terminal; or the first information is the quantity of subsequent data packets sent by the terminal after the terminal sends the first data packet.

In this embodiment of the present invention, the subsequent data packets are data packets sent by the terminal after the terminal sends the first data packet.

For example, the terminal needs to send five data packets. After sending the first data packet, the terminal further needs to send four subsequent data packets. In this case, the first information may be 4, or may be 5.

Optionally, when the quantity of subsequent data packets sent by the terminal after the terminal sends the first data packet is greater than a specified threshold, the base station allocates a transmission resource unit to the terminal to send the subsequent data packets; and the terminal sends the subsequent data packets on the transmission resource unit allocated by the base station.

The specified threshold may be set depending on an actual situation. Optionally, the threshold is set to 10.

The base station divides all transmission resources into a transmission resource unit used for uplink scheduling and a transmission resource unit used for uplink contention. The terminal sends the subsequent data packets by using a transmission resource unit that is allocated by the base station to the terminal from at least one transmission resource unit used for uplink scheduling and that is used to send the subsequent data packets.

The base station allocates, to the terminal from the at least one transmission resource unit used for uplink scheduling, the transmission resource unit used to send the subsequent data packets.

In this case, the base station does not need to determine occupation status information of the transmission resource that is allocated to the terminal and that is used to send the subsequent data packets.

When the base station does not distinguish between a transmission resource unit used for uplink scheduling and a transmission resource unit used for uplink contention, the base station further needs to determine occupation status information of a transmission resource unit that is allocated to the terminal and that is used to send the subsequent data packets.

Optionally, based on the transmission resource unit occupied to send the first data packet and the pilot cyclic shift and/or the orthogonal cover code used to send the first data packet, and based on a predetermined relationship between a transmission resource unit that needs to be occupied to send each subsequent data packet and the transmission resource unit occupied to send the first data packet, and a predetermined relationship between a pilot cyclic shift and/or an orthogonal cover code that need/needs to be used to send each subsequent data packet and the pilot cyclic shift and/or the orthogonal cover code used to send the first data packet, the terminal determines a transmission resource unit used to send each subsequent data packet, and a pilot cyclic shift and/or an orthogonal cover code used to send each subsequent data packet; and sends each subsequent data packet by using the transmission resource unit used to send each subsequent data packet, and the pilot cyclic shift and/or the orthogonal cover code used to send each subsequent data packet.

Optionally, a manner of triggering the terminal to determine the transmission resource unit used to send each subsequent data packet, and the pilot cyclic shift and/or the orthogonal cover code used to send each subsequent data packet is:

the terminal determines that the quantity of subsequent data packets that further need to be sent after the first data packet is sent is less than a specified threshold.

When a transmission resource unit is an RB, for example, in FIG. 3, it is assumed that: two subsequent data packets further need to be sent after the first data packet is sent, it is determined that the RB used to send the first data packet is an RB whose information is 1, and a relationship between the RB used to send the first data packet and RBs used to send the subsequent data packets is that the RBs sequentially occupy different subcarriers (for example, the RB used to send the first data packet is the RB whose information is 1, an RB used to send a second data packet is an RB whose information is 2, and an RB used to send a third data packet is an RB whose information is 3). The RB whose information is 2 and the RB whose information is 3 satisfy that a quantity of other terminals occupying the RBs is less than the maximum quantity of terminals that are allowed to simultaneously occupy one RB.

If one of the RB whose information is 2 and the RB whose information is 3 does not satisfy that a quantity of other terminals occupying the RB is less than the maximum quantity of terminals that are allowed to simultaneously occupy one RB, an RB that can be used to send the first data packet is reselected, and it is determined whether an RB used to send a subsequent data packet satisfies that a quantity of other terminals occupying the RB is less than the maximum quantity of terminals that are allowed to simultaneously occupy one RB, until an RB that is used to send a subsequent data packet and that is determined by using a selected RB that can be used to send the first data packet satisfies that a quantity of other terminals occupying the RB is less than the maximum quantity of terminals that are allowed to simultaneously occupy one RB.

If the quantity of subsequent data packets that need to be further sent by the terminal after the terminal sends the first data packet is greater than a specified threshold, the terminal sends the first data packet to the base station on the RB determined based on the RB occupation status information, where the first data packet carries first information. The base station receives the first data packet sent by the terminal, and determines, based on the first information, the quantity of subsequent data packets that need to be further sent by the terminal after the terminal sends the first data packet. When determining that the quantity of subsequent data packets exceeds the specified threshold, the base station allocates, to the terminal, an RB used to send the subsequent data packets. The terminal sends the subsequent data packets by using the RB that is allocated by the base station and that is used to send the subsequent data packets.

Optionally, the first data packet further includes second information. The second information is a relationship between a transmission resource unit that needs to be occupied to send each subsequent data packet and the transmission resource unit occupied to send the first data packet, and a relationship between a pilot cyclic shift and/or an orthogonal cover code used to send each subsequent data packet and the pilot cyclic shift and/or the orthogonal cover code used to send the first data packet.

If the quantity of subsequent data packets that need to be further sent by the terminal after the terminal sends the first data packet is less than a specified threshold, the following operations are performed for each subsequent data packet:

based on the transmission resource unit occupied to send the first data packet and the pilot cyclic shift and/or the orthogonal cover code used to send the first data packet, and based on the second information, determining, by the terminal, a transmission resource unit used to send the subsequent data packet, and a pilot cyclic shift and/or an orthogonal cover code used to send the subsequent data packet; and sending the subsequent data packet by using the determined transmission resource unit and the determined pilot cyclic shift and/or orthogonal cover code.

In addition, in this embodiment of the present invention, when the base station updates the transmission resource occupation status information, an optional method is: When the quantity of subsequent data packets that need to be sent by the terminal is greater than a specified reference threshold, the base station determines status information of a transmission resource occupied to send the subsequent data packets, and updates the transmission resource occupation status information based on information about a transmission resource unit occupied to send the subsequent data packets.

When the transmission resource occupation status information is information about at least one idle-state transmission resource unit in the transmission resource within the preset duration, information about at least one idle-state transmission resource unit in a transmission resource within next preset duration is determined based on the information about the transmission resource unit occupied to send the subsequent data packets.

When the transmission resource occupation status information is other information, a case is similar to that of updating the transmission resource occupation status information when the transmission resource occupation status information is the information about the at least one idle-state transmission resource unit in the transmission resource within the preset duration. Details are not described herein.

The reference threshold may be set depending on an actual situation.

When the quantity of subsequent data packets does not exceed a specified reference threshold, duration in which the terminal occupies the determined transmission resource unit and the determined pilot cyclic shift and/or orthogonal cover code to send the subsequent data packets is relatively short. Therefore, the base station directly determines that the transmission resource unit is in an idle state in next preset duration. This reduces processing complexity of the base station.

Based on a same inventive idea, an embodiment of the present invention further provides a data transmission terminal. A method corresponding to the data transmission terminal is the data transmission method in the embodiments of the present invention. Therefore, for an implementation of the data transmission terminal in this embodiment of the present invention, refer to the implementation of the method. Repeated content is not described herein again.

As shown in FIG. 4, the data transmission terminal in this embodiment of the present invention includes a processing unit 400 and a transceiver unit 401. The transceiver unit 401 is configured to obtain transmission resource occupation status information broadcast by a base station, where the transmission resource occupation status information includes a status that at least one transmission resource unit in a transmission resource within preset duration is occupied by another terminal. The processing unit 400 is configured to determine, based on the transmission resource occupation status information, a transmission resource unit used to send a first data packet, where a size of the first data packet is not greater than a maximum size of data that one transmission resource unit is allowed to carry. Finally, the transceiver unit 401 is further configured to send the first data packet by using the determined transmission resource unit.

Optionally, the transmission resource occupation status information is information about at least one idle-state transmission resource unit in the transmission resource within the preset duration. The idle-state transmission resource unit is a transmission resource unit not occupied by another terminal. When determining, based on the transmission resource occupation status information, the transmission resource unit used to send the first data packet, the processing unit 400 is specifically configured to determine, based on the transmission resource usage information, that the transmission resource unit used to send the first data packet is a transmission resource unit corresponding to information about an idle-state transmission resource unit.

Optionally, the transmission resource occupation status information is information about all transmission resource units in the transmission resource within the preset duration, and information about a transmission resource unit occupied by another terminal. The processing unit 400 determines, based on the transmission resource occupation status information, information about at least one transmission resource unit not occupied by another terminal. When determining, based on the transmission resource occupation status information, the transmission resource unit used to send the first data packet, the processing unit 400 is specifically configured to determine that the transmission resource unit used to send the first data packet is a transmission resource unit corresponding to information about a transmission resource unit not occupied by another terminal.

Optionally, the transmission resource occupation status information is information about at least one target transmission resource unit in the transmission resource within the preset duration, and at least one pilot cyclic shift and/or orthogonal cover code allowed to be used when each target transmission resource unit is occupied to transmit a data packet. The target transmission resource unit is a transmission resource unit that has been occupied by another terminal. A quantity of other terminals occupying the target transmission resource unit is less than a maximum quantity of terminals that are allowed to simultaneously occupy one transmission resource unit. The processing unit 400 is specifically configured to determine, based on the transmission resource occupation status information, a transmission resource unit corresponding to information about a target transmission resource unit used to send the first data packet, and a pilot cyclic shift and/or an orthogonal cover code used to send the first data packet. The transceiver unit 401 is specifically configured to send the first data packet by using the determined transmission resource unit and the determined pilot cyclic shift and/or orthogonal cover code used to send the first data packet.

Optionally, the transmission resource occupation status information is information about at least one transmission resource unit that has been occupied by another terminal, a maximum quantity of terminals that are allowed to simultaneously occupy one transmission resource unit to transmit data packets, a quantity of other terminals occupying each transmission resource unit, and information about a pilot cyclic shift and/or an orthogonal cover code allowed to be used when a data packet is transmitted by using each transmission resource unit that has been occupied by another terminal. The processing unit 400 is specifically configured to determine, based on the transmission resource occupation status information, that the transmission resource unit used to send the first data packet is a target transmission resource unit, where the target transmission resource unit is a transmission resource unit that has been occupied by another terminal, and a quantity of other terminals occupying the target transmission resource unit is less than the maximum quantity of terminals that are allowed to simultaneously occupy one transmission resource unit. The transceiver 401 is specifically configured to send the first data packet by using the determined transmission resource unit and the determined pilot cyclic shift and/or orthogonal cover code used to send the first data packet.

Optionally, the first data packet includes first information. The first information is used by the base station to determine a quantity of subsequent data packets sent by the terminal after the terminal sends the first data packet. A size of each subsequent data packet is not greater than the maximum size of data that one transmission resource unit is allowed to carry.

Optionally, the first information is a total quantity of the first data packet and the subsequent data packets sent by the transceiver unit 401; or the first information is the quantity of subsequent data packets sent by the transceiver unit 401 after the transceiver unit 401 sends the first data packet.

Optionally, when the quantity of subsequent data packets sent by the transceiver unit 401 after the transceiver unit 401 sends the first data packet is greater than a specified threshold, the transceiver unit 401 is further configured to send the subsequent data packets on a transmission resource unit allocated by the base station.

Optionally, the transceiver unit 401 sends the subsequent data packets by using a transmission resource unit that is allocated by the base station and that is used for uplink scheduled transmission.

Optionally, when the quantity of subsequent data packets sent by the transceiver unit 401 after the transceiver unit 401 sends the first data packet is less than a specified threshold, based on the transmission resource unit occupied to send the first data packet and the pilot cyclic shift and/or the orthogonal cover code used to send the first data packet, and based on a predetermined relationship between a transmission resource unit that needs to be occupied to send each subsequent data packet and the transmission resource unit occupied to send the first data packet, and a predetermined relationship between a pilot cyclic shift and/or an orthogonal cover code that need/needs to be used to send each subsequent data packet and the pilot cyclic shift and/or the orthogonal cover code used to send the first data packet, the processing unit 400 determines a transmission resource unit used to send each subsequent data packet, and a pilot cyclic shift and/or an orthogonal cover code used to send each subsequent data packet. The transceiver unit is further configured to send each subsequent data packet by using the transmission resource unit used to send each subsequent data packet, and the pilot cyclic shift and/or the orthogonal cover code used to send each subsequent data packet.

Optionally, the first data packet further includes second information. The second information is a relationship between a transmission resource unit that needs to be occupied to send each subsequent data packet and the transmission resource unit occupied to send the first data packet, and a relationship between a pilot cyclic shift and/or an orthogonal cover code used to send each subsequent data packet and the pilot cyclic shift and/or the orthogonal cover code used to send the first data packet.

If the quantity of subsequent data packets that need to be further sent by the transceiver unit 401 after the transceiver unit 401 sends the first data packet is less than a specified threshold, the following operations are performed for each subsequent data packet:

the processing unit 400 is further configured to: based on the transmission resource unit occupied to send the first data packet and the pilot cyclic shift and/or the orthogonal cover code used to send the first data packet, and based on the second information, determine a transmission resource unit used to send the subsequent data packet, and a pilot cyclic shift and/or an orthogonal cover code used to send the subsequent data packet; and the transceiver unit is further configured to send the subsequent data packet by using the determined transmission resource unit and the determined pilot cyclic shift and/or orthogonal cover code.

Optionally, if the transceiver unit 401 further sends a subsequent data packet after sending the first data packet, before the transceiver unit 401 sends the first data packet, based on the preset relationship between a transmission resource unit occupied to send each subsequent data packet and the transmission resource unit occupied to send the first data packet, the processing unit 400 determines a transmission resource unit occupied to send each subsequent data packet when the transmission resource unit is occupied to send the first data packet. Any transmission resource unit occupied to send each subsequent data packet satisfies that a quantity of other terminals occupying the transmission resource unit occupied to send the subsequent data packet is less than the maximum quantity of terminals that are allowed to simultaneously occupy one transmission resource unit.

Figure 5:
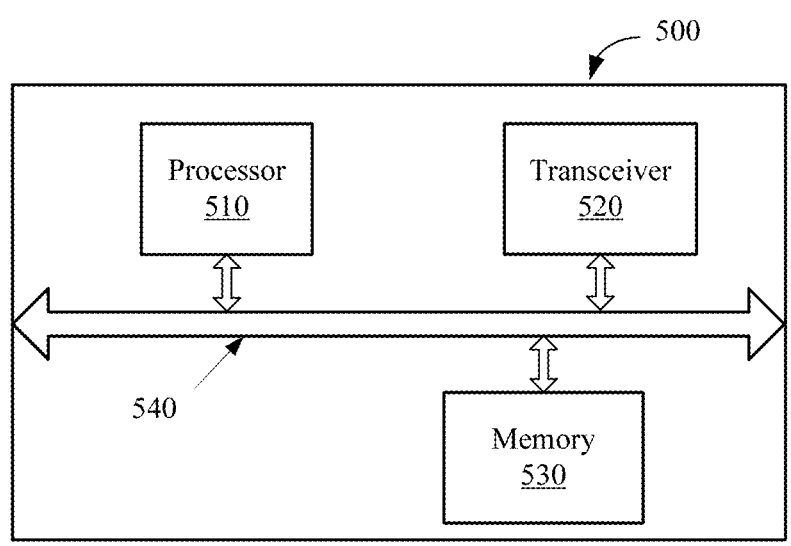
FIG. 5 is a schematic diagram of a hardware structure of a data transmission terminal according to an embodiment of the present invention.

It should be noted that, in this embodiment of the present invention, the processing unit 400 may be implemented by a processor, and the transceiver unit 401 may be implemented by a transceiver. As shown in FIG. 5, a hardware structure of a terminal 500 may include a processor 510, a transceiver 520, and a memory 530. The memory 530 may be configured to store a program or code that is pre-installed on the terminal 500 at delivery, or may be configured to store code to be executed by the processor 510, or the like.

The components of the terminal 500 are coupled together by using a bus system 540. In addition to a data bus, the bus system 540 further includes a power bus, a control bus, and a status signal bus.

The processor 510 may be a general-purpose central processing unit (Central Processing Unit, CPU), a microprocessor, a microprocessor, an application-specific integrated circuit (Application-Specific Integrated Circuit, ASIC), or one or more integrated circuits, and is configured to perform related operations, so as to implement the technical solutions provided in the embodiments of the present invention.

It should be noted that, although the terminal 500 shown in FIG. 5 includes only the processor 510, the transceiver 520, and the memory 530, in a specific implementation process, persons skilled in the art should understand that the terminal further includes other components required for implementing normal operating. In addition, persons skilled in the art should understand that, depending on a specific requirement, the terminal may further include hardware components for implementing other additional functions. In addition, persons skilled in the art should understand that the terminal may include only a component or a module mandatory for implementing the embodiments of the present invention, and does not need to include all the devices shown in FIG. 5.

Persons of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed.

The storage medium may be a magnetic disk, an optical disc, a read-only memory (ROM: Read-Only Memory), a random access memory (RAM: Random Access Memory), or the like.

In addition, the data transmission method in the embodiments of the present invention may alternatively be implemented by a hardware device or a chip, specifically including an input/output interface, at least one processor, a memory, a bus, and the like. The input/output interface, the at least one processor, and the memory are connected to each other by using the bus. The memory is configured to store data that needs to be transmitted. The processor executes a program for the data transmission technical solutions in the embodiments of the present invention. The input/output interface is configured to send and receive data that needs to be transmitted. The processor is configured to execute a program for the data transmission technical solutions in the embodiments of the present invention.

Specifically, the chip is embedded in a terminal, so that the terminal has a data transmission function in the embodiments of the present invention.

Based on a same inventive idea, an embodiment of the present invention further provides a data transmission base station. A method corresponding to the data transmission base station is the data transmission method in the embodiments of the present invention. Therefore, for an implementation of the data transmission base station in this embodiment of the present invention, refer to the implementation of the method. Repeated content is not described herein again.

Figure 6:
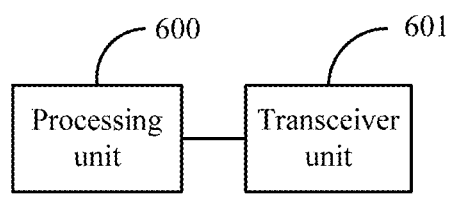
FIG. 6 is a schematic structural diagram of a data transmission base station according to an embodiment of the present invention.

As shown in FIG. 6, the data transmission base station in this embodiment of the present invention includes a processing unit 600 and a transceiver unit 601. The processing unit 600 is configured to determine transmission resource occupation status information, where the transmission resource occupation status information includes a status that at least one transmission resource unit in a transmission resource within preset duration is occupied by a terminal under control of the base station, and a size of a data packet is not greater than a maximum size of data that one transmission resource unit is allowed to carry. The transceiver unit 601 is configured to broadcast the transmission resource occupation status information.

Optionally, the transmission resource occupation status information is information about at least one idle-state transmission resource unit in the transmission resource within the preset duration, and the idle-state transmission resource unit is a transmission resource unit not occupied by another terminal.

Optionally, the transmission resource occupation status information is information about all transmission resource units in the transmission resource within the preset duration, and information about a transmission resource unit occupied by another terminal.

Optionally, the transmission resource occupation status information is information about at least one target transmission resource unit in the transmission resource within the preset duration, and at least one pilot cyclic shift and/or orthogonal cover code allowed to be used when each target transmission resource unit is occupied to transmit a data packet. Target transmission resource unit is a transmission resource unit that has been occupied by another terminal. A quantity of other terminals occupying the target transmission resource unit is less than a maximum quantity of terminals that are allowed to simultaneously occupy one transmission resource unit.

Optionally, the transmission resource occupation status information is information about at least one transmission resource unit that has been occupied by another terminal, a maximum quantity of terminals that are allowed to simultaneously occupy one transmission resource unit to transmit data packets, a quantity of other terminals occupying each transmission resource unit, and information about a pilot cyclic shift and/or an orthogonal cover code allowed to be used when a data packet is transmitted by using each transmission resource unit that has been occupied by another terminal.

Optionally, the transceiver unit 601 is further configured to: after broadcasting the transmission resource occupation status information, receive a first data packet that is sent by any terminal under control by using a transmission resource unit determined based on the transmission resource occupation status information, where the first data packet includes first information, the first information is used to indicate, to the base station, a quantity of subsequent data packets sent by the terminal after the terminal sends the first data packet, and a size of the first data packet and each subsequent data packet is not greater than the maximum size of data that one transmission resource unit is allowed to carry. The processing unit 600 is further configured to: determine, based on the first information, the quantity of subsequent data packets sent by the terminal after the terminal sends the first data packet; and when it is determined that the quantity of subsequent data packets exceeds a preset threshold, allocate, to the terminal, a transmission resource unit used to send the subsequent data packets.

Optionally, the first information is a total quantity of the first data packet and the subsequent data packets sent by the terminal; or the first information is the quantity of subsequent data packets sent by the terminal after the terminal sends the first data packet.

Optionally, when allocating, to the terminal, the transmission resource unit used to send the subsequent data packets, the processing unit 600 is specifically configured to allocate, to the terminal from a transmission resource used for uplink scheduled transmission, a transmission resource unit used to send the subsequent data packets.

Optionally, the processing unit 600 is further configured to: determine the transmission resource unit occupied by the terminal to send the first data packet, and a pilot cyclic shift and/or an orthogonal cover code used to send the first data packet; if it is determined that the quantity of subsequent data packets sent by the terminal after the terminal sends the first data packet does not exceed a threshold, based on a predetermined relationship between a transmission resource unit occupied to send each subsequent data packet and the transmission resource unit occupied by the first data packet, and a predetermined relationship between a pilot cyclic shift and/or an orthogonal cover code used to send each subsequent data packet and the pilot cyclic shift and/or the orthogonal cover code used to send the first data packet, determine a transmission resource unit occupied when the terminal sends each subsequent data packet, and a pilot cyclic shift and/or an orthogonal cover code used when the terminal sends each subsequent data packet.

The transceiver unit 601 is further configured to receive each subsequent data packet by using the determined transmission resource unit occupied when the terminal sends each subsequent data packet, and the determined pilot cyclic shift and/or orthogonal cover code used when the terminal sends each subsequent data packet.

Optionally, the first data packet further includes second information. The second information is used to indicate a relationship between a transmission resource unit occupied when the terminal sends each subsequent data packet and the transmission resource unit occupied to send the first data packet, and a relationship between a pilot cyclic shift and/or an orthogonal cover code used to send each subsequent data packet and the pilot cyclic shift and/or the orthogonal cover code used to send the first data packet.

The processing unit 600 is further configured to determine, based on the second information, a transmission resource unit occupied by the terminal to send each subsequent data packet, and a pilot cyclic shift and/or an orthogonal cover code used to send each subsequent data packet.

The transceiver unit 601 is further configured to receive each subsequent data packet by using the transmission resource unit occupied when the terminal sends each subsequent data packet, and the pilot cyclic shift and/or orthogonal cover code used when the terminal sends each subsequent data packet.

Figure 7:
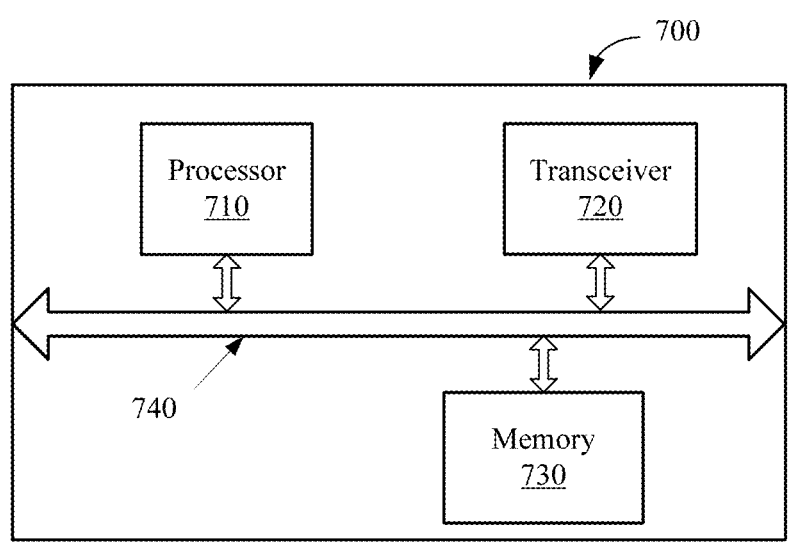
FIG. 7 is a schematic diagram of a hardware structure of a data transmission base station according to an embodiment of the present invention.

It should be noted that, in this embodiment of the present invention, the processing unit 600 may be implemented by a processor, and the transceiver unit 601 may be implemented by a transceiver. As shown in FIG. 7, a hardware structure of a base station 700 may include a processor 710, a transceiver 720, and a memory 730. The memory 730 may be configured to store a program or code that is pre-installed on the base station 700 at delivery, or may be configured to store code to be executed by the processor 710, or the like.

The components of the base station 700 are coupled together by using a bus system 740. In addition to a data bus, the bus system 740 further includes a power bus, a control bus, and a status signal bus.

The processor 710 may be a general-purpose central processing unit (Central Processing Unit, CPU), a microprocessor, a microprocessor, an application-specific integrated circuit (Application-Specific Integrated Circuit, ASIC), or one or more integrated circuits, and is configured to perform related operations, so as to implement the technical solutions provided in the embodiments of the present invention.

It should be noted that, although the base station 700 shown in FIG. 7 includes only the processor 710, the transceiver 720, and the memory 730, in a specific implementation process, persons skilled in the art should understand that the base station further includes other components required for implementing normal operating. In addition, persons skilled in the art should understand that, depending on a specific requirement, the base station may further include hardware components for implementing other additional functions. In addition, persons skilled in the art should understand that the base station may include only a device or a module mandatory for implementing the embodiments of the present invention, and does not need to include all the components shown in FIG. 7.

Persons of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disc, a read-only memory (ROM: Read-Only Memory), a random access memory (RAM: Random Access Memory), or the like.

In addition, the data transmission method in the embodiments of the present invention may alternatively be implemented by a hardware device or a chip, specifically including an input/output interface, at least one processor, a memory, a bus, and the like. The input/output interface, the at least one processor, and the memory are connected to each other by using the bus. The memory is configured to store data that needs to be transmitted. The processor executes a program for the data transmission technical solutions in the embodiments of the present invention. The input/output interface is configured to send and receive data that needs to be transmitted. The processor is configured to execute a program for the data transmission technical solutions in the embodiments of the present invention.

Specifically, the chip is embedded in a base station, so that the base station has a data transmission function in the embodiments of the present invention.

An embodiment of the present invention further provides a computer-readable storage medium. The computer-readable storage medium is configured to store a computer software instruction used to perform the technical solutions in the embodiments of the present invention, and includes a program designed to perform the technical solutions in the embodiments of the present invention.

An embodiment of the present invention further provides a network-side data transmission system, including any data transmission base station in the embodiments of the present invention.

Figure 8:
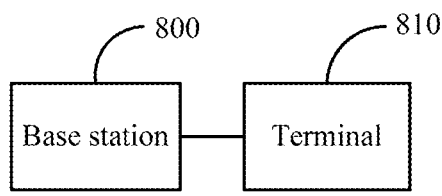
FIG. 8 is a schematic structural diagram of a network system according to an embodiment of the present invention.

As shown in FIG. 8, the network system in this embodiment of the present invention includes a data transmission base station 800 in an embodiment of the present invention and a data transmission terminal 810 in an embodiment of the present invention.

It can be learned from the foregoing content that the terminal obtains the transmission resource occupation status information broadcast by the base station, where the transmission resource occupation status information includes status information indicating that at least one transmission resource unit in a transmission resource within preset duration is occupied by another terminal; determines, based on the transmission resource occupation status information, the transmission resource unit used to send the first data packet, where the size of the first data packet is not greater than the maximum size of data that one transmission resource unit is allowed to carry; and finally sends the first data packet by using the determined transmission resource unit. In this technical solution, the terminal can determine, based on the transmission resource occupation status information broadcast by the base station, the transmission resource unit used to send the first data packet. This avoids a problem in a non-scheduled solution that a terminal does not know transmission resource occupation status information, and sends a first data packet by using a transmission resource unit that cannot be used to transmit a data packet; reduces a possibility that a terminal transmits a first data packet by using a transmission resource that cannot be used to transmit a data packet; and reduces a latency for sending a data packet.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some example embodiments of the present invention have been described, persons skilled in the art can make changes and modifications to these embodiments once they learn the basic inventive concept. Therefore, the following claims are intended to be construed as to cover the example embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A data transmission method, comprising:
    obtaining, by a terminal, transmission resource occupation status information broadcast by a base station, wherein the transmission resource occupation status information comprises a status that at least one transmission resource unit in a transmission resource within preset duration is occupied by another terminal, wherein the transmission resource occupation status information comprises information about at least one target transmission resource unit in the transmission resource within the preset duration, and at least one pilot cyclic shift and/or orthogonal cover code allowed to be used when each target transmission resource unit is occupied to transmit a data packet, the target transmission resource unit is a transmission resource unit that has been occupied by another terminal, and a quantity of other terminals occupying the target transmission resource unit is less than a maximum quantity of terminals that are allowed to simultaneously occupy one transmission resource unit;
    determining, by the terminal based on the transmission resource occupation status information, a transmission resource unit used to send a first data packet, wherein a size of the first data packet is not greater than a maximum size of data that one transmission resource unit is allowed to carry, comprising:
        determining, by the terminal based on the transmission resource occupation status information, a transmission resource unit corresponding to information about a target transmission resource unit used to send the first data packet, and a pilot cyclic shift and/or an orthogonal cover code used to send the first data packet; and
    sending, by the terminal, the first data packet by using the determined transmission resource unit, comprising:
        sending, by the terminal, the first data packet by using the determined transmission resource unit and the determined pilot cyclic shift and/or orthogonal cover code used to send the first data packet.

2. The method according to claim 1, wherein the transmission resource occupation status information is information about at least one idle-state transmission resource unit in the transmission resource within the preset duration, and the idle-state transmission resource unit is a transmission resource unit not occupied by another terminal; and
    the determining, by the terminal based on the transmission resource occupation status information, a transmission resource unit used to send a first data packet comprises:
    determining, by the terminal based on the transmission resource usage information, that the transmission resource unit used to send the first data packet is a transmission resource unit corresponding to information about an idle-state transmission resource unit.

3. The method according to claim 1, wherein the first data packet comprises first information, the first information is used by the base station to determine a quantity of subsequent data packets to be sent by the terminal after the terminal sends the first data packet, and a size of each subsequent data packet is not greater than the maximum size of data that one transmission resource unit is allowed to carry.

4. A data transmission method, comprising:
    obtaining by a terminal, transmission resource occupation status information broadcast by a base station, wherein the transmission resource occupation status information comprises a status that at least one transmission resource unit in a transmission resource within preset duration is occupied by another terminal;
    determining, by the terminal based on the transmission resource occupation status information, a transmission resource unit used to send a first data packet, wherein a size of the first data packet is not greater than a maximum size of data that one transmission resource unit is allowed to carry;
    sending by the terminal, the first data packet by using the determined transmission resource unit, wherein the first data packet comprises first information, the first information is used by the base station to determine a quantity of subsequent data packets to be sent by the terminal after the terminal sends the first data packet, and a size of each subsequent data packet is not greater that the maximum size of data that one transmission resource unit is allowed to carry; and
    when the quantity of subsequent data packets to be sent by the terminal after the terminal sends the first data packet is greater than a specified threshold, sending, by the terminal, the subsequent data packets on a transmission resource unit allocated by the base station.

5. The method according to claim 4, further comprising:
when the quantity of subsequent data packets to be sent by the terminal after the terminal sends the first data packet is less than a specified threshold,
based on the transmission resource unit occupied to send the first data packet and a pilot cyclic shift and/or an orthogonal cover code used to send the first data packet, and based on a predetermined relationship between a transmission resource unit that needs to be occupied to send each subsequent data packet and the transmission resource unit occupied to send the first data packet, and a predetermined relationship between a pilot cyclic shift and/or an orthogonal cover code that need/needs to be used to send each subsequent data packet and the pilot cyclic shift and/or the orthogonal cover code used to send the first data packet, determining, by the terminal, the transmission resource unit used to send each subsequent data packet, and the pilot cyclic shift and/or the orthogonal cover code used to send each subsequent data packet; and
sending, by the terminal, each subsequent data packet by using the transmission resource unit used to send each subsequent data packet, and the pilot cyclic shift and/or the orthogonal cover code used to send each subsequent data packet.

6. A data transmission method, comprising:
determining, by a base station, transmission resource occupation status information, wherein the transmission resource occupation status information comprises a status that at least one transmission resource unit in a transmission resource within preset duration is occupied by a terminal under control of the base station, and a size of a data packet is not greater than a maximum size of data that one transmission resource unit is allowed to carry, wherein the transmission resource occupation status information is information about at least one target transmission resource unit in the transmission resource within the preset duration, and at least one pilot cyclic shift and/or orthogonal cover code allowed to be used when each target transmission resource unit is occupied to transmit a data packet, the target transmission resource unit is a transmission resource unit that has been occupied by another terminal, and a quantity of other terminals occupying the target transmission resource unit is less than a maximum quantity of terminals that are allowed to simultaneously occupy one transmission resource unit; and
broadcasting, by the base station, the transmission resource occupation status information.

7. The method according to claim 6, wherein the transmission resource occupation status information is information about at least one idle-state transmission resource unit in the transmission resource within the preset duration, and the idle-state transmission resource unit is a transmission resource unit not occupied by another terminal.

8. The method according to claim 6, wherein after the broadcasting, by the base station, the transmission resource occupation status information, the method further comprises:
receiving, by the base station, a first data packet that is sent by any terminal under control by using a transmission resource unit determined based on the transmission resource occupation status information, wherein the first data packet comprises first information, the first information is used to indicate, to the base station, a quantity of subsequent data packets to be sent by the terminal after the terminal sends the first data packet, and a size of the first data packet and each subsequent data packet is not greater than the maximum size of data that one transmission resource unit is allowed to carry;
determining, by the base station based on the first information, the quantity of subsequent data packets to be sent by the terminal after the terminal sends the first data packet; and
when it is determined that the quantity of subsequent data packets exceeds a preset threshold, allocating, by the base station, a transmission resource unit used to send the subsequent data packets.

9. An apparatus, comprising:
a transceiver, configured to obtain transmission resource occupation status information broadcast by a base station, wherein the transmission resource occupation status information comprises a status that at least one transmission resource unit in a transmission resource within preset duration is occupied by another terminal, wherein the transmission resource occupation status information comprises information about at least one target transmission resource unit in the transmission resource within the preset duration, and at least one pilot cyclic shift and/or orthogonal cover code allowed to be used when each target transmission resource unit is occupied to transmit a data packet, the target transmission resource unit is a transmission resource unit that has been occupied by another terminal, and a quantity of other terminals occupying the target transmission resource unit is less than a maximum quantity of terminals that are allowed to simultaneously occupy one transmission resource unit; and
a processor, configured to determine, based on the transmission resource occupation status information, a transmission resource unit used to send a first data packet, wherein a size of the first data packet is not greater than a maximum size of data that one transmission resource unit is allowed to carry, wherein the processor is further configured to:
determine, based on the transmission resource occupation status information, a transmission resource unit corresponding to information about a target transmission resource unit used to send the first data packet, and a pilot cyclic shift and/or an orthogonal cover code used to send the first data packet; wherein
the transceiver is configured to send the first data packet by using the determined transmission resource unit, when sending the first data packet by using the determined transmission resource unit, the transceiver is configured to:
send the data packet by using the determined transmission resource unit and the determined pilot cyclic shift and/or orthogonal cover code used to send the fist data packet.

10. The apparatus according to claim 9, wherein the transmission resource occupation status information is information about at least one idle-state transmission resource unit in the transmission resource within the preset duration, and the idle-state transmission resource unit is a transmission resource unit not occupied by another terminal; and
when determining, based on the transmission resource occupation status information, the transmission resource unit used to send the first data packet, the processor is configured to:

determine, based on the transmission resource usage information, that the transmission resource unit used to send the first data packet is a transmission resource unit corresponding to information about an idle-state transmission resource unit.

11. The apparatus according to claim 9, wherein the first data packet comprises first information, the first information is used by the base station to determine a quantity of subsequent data packets to be sent by the apparatus after the apparatus sends the first data packet, and a size of each subsequent data packet is not greater than the maximum size of data that one transmission resource unit is allowed to carry.

12. An apparatus comprising:
a transceiver, configured to obtain transmission resource occupation status information broadcast by a base station, wherein the transmission resource occupation status information comprises a status that at least one transmission resource unit in a transmission resource within preset duration is occupied by another terminal; and
a processor, configured to determine based on the transmission resource occupation status information a transmission resource unit used to send a first data packet, wherein a size of the first data packet is not greater than a maximum size of data that one transmission resource unit is allowed to carry, wherein
the transceiver is configured to send the first data packet by using the determined transmission resource unit, wherein the first data packet comprises first information, the first information is used by the base station to determine a quantity of subsequent data packets to be sent by the apparatus after the apparatus sends the first data packet and a size of each subsequent data packet is not greater than the maximum size of data that one transmission resource unit is allowed to carry, wherein the transceiver is further configured to:
when the quantity of subsequent data packets to be sent after the first data packet is sent is greater than a specified threshold, send the subsequent data packets on a transmission resource unit allocated by the base station.

13. The apparatus according to claim 12, wherein when the quantity of subsequent data packets to be sent by the transceiver after the transceiver sends the first data packet is less than a specified threshold,
the processor is configured to:
based on the transmission resource unit occupied to send the first data packet and a pilot cyclic shift and/or an orthogonal cover code used to send the first data packet, and based on a predetermined relationship between a transmission resource unit that needs to be occupied to send each subsequent data packet and the transmission resource unit occupied to send the first data packet, and a predetermined relationship between a pilot cyclic shift and/or an orthogonal cover code that need/needs to be used to send each subsequent data packet and the pilot cyclic shift and/or the orthogonal cover code used to send the first data packet, determine the transmission resource unit used to send each subsequent data packet, and the pilot cyclic shift and/or the orthogonal cover code used to send each subsequent data packet; and the transceiver is configured to:
send each subsequent data packet by using the transmission resource unit used to send each subsequent data packet, and the pilot cyclic shift and/or the orthogonal cover code used to send each subsequent data packet.

14. An apparatus, comprising:
a processor, configured to determine transmission resource occupation status information, wherein the transmission resource occupation status information comprises a status that at least one transmission resource unit in a transmission resource within preset duration is occupied by a terminal under control of the apparatus, and a size of a data packet is not greater than a maximum size of data that one transmission resource unit is allowed to carry, wherein the transmission resource occupation status information is information about at least one target transmission resource unit in the transmission resource within the preset duration, and at least one pilot cyclic shift and/or orthogonal cover code allowed to be used when each target transmission resource unit is occupied to transmit a data packet, the target transmission resource unit is a transmission resource unit that has been occupied by another terminal, and a quantity of other terminals occupying the target transmission resource unit is less than a maximum quantity of terminals that are allowed to simultaneously occupy one transmission resource unit; and
a transceiver, configured to broadcast the transmission resource occupation status information.

15. The apparatus according to claim 14, wherein the transmission resource occupation status information is information about at least one idle-state transmission resource unit in the transmission resource within the preset duration, and the idle-state transmission resource unit is a transmission resource unit not occupied by another terminal.

16. The apparatus according to claim 14, wherein the transceiver is configured to:
after broadcasting the transmission resource occupation status information, receive a first data packet that is sent by any terminal under control by using a transmission resource unit determined based on the transmission resource occupation status information, wherein the first data packet comprises first information, the first information is used to indicate, to the apparatus, a quantity of subsequent data packets to be sent by the terminal after the terminal sends the first data packet, and a size of the first data packet and each subsequent data packet is not greater than the maximum size of data that one transmission resource unit is allowed to carry; and
the processor is further configured to:
determine, based on the first information, the quantity of subsequent data packets to be sent by the terminal after the terminal sends the first data packet; and when it is determined that the quantity of subsequent data packets exceeds a preset threshold, allocate, to the terminal, a transmission resource unit used to send the subsequent data packets.

* * * * *

UNITED STATES PATENT AND TRADEMARK OFFICE
CERTIFICATE OF CORRECTION

PATENT NO. : 10,873,879 B2
APPLICATION NO. : 16/201357
DATED : December 22, 2020
INVENTOR(S) : Xinzheng Wang, Kaijie Zhou and Tianle Deng Page 1 of 1

It is certified that error appears in the above-identified patent and that said Letters Patent is hereby corrected as shown below:

In the Claims

In Claim 4, Column 28, Line 63, delete "greater that the maximum" and insert --greater than the maximum--.

In Claim 9, Column 30, Line 54, delete "send the data packet" and insert --send the first data packet--.

In Claim 9, Column 30, Line 56, delete "fist" and insert --first--.

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*